United States Patent [19]

Muranaka

[11] Patent Number: 4,700,472
[45] Date of Patent: Oct. 20, 1987

[54] WORKING APPARATUS PROVIDED ALONG A WORKPIECE CONVEYOR

[75] Inventor: Kozo Muranaka, Hiroshima, Japan

[73] Assignee: Mazda Motor Corporation, Hiroshima, Japan

[21] Appl. No.: 828,266

[22] Filed: Feb. 11, 1986

[30] Foreign Application Priority Data

Feb. 19, 1985 [JP] Japan ............................. 60-22256[U]

[51] Int. Cl.⁴ .............................................. B23P 19/00
[52] U.S. Cl. ......................................... 29/822; 29/794; 29/824
[58] Field of Search ................... 29/794, 824, 822–823

[56] References Cited

U.S. PATENT DOCUMENTS

| 2,757,447 | 8/1956 | Barenyi | 29/794 |
| 2,779,092 | 1/1957 | Gordon | 29/824 |
| 4,033,033 | 7/1977 | Heffner | 29/824 |
| 4,589,184 | 5/1986 | Asano et al. | 29/824 |
| 4,589,299 | 5/1986 | Ohtaki et al. | 29/824 |

FOREIGN PATENT DOCUMENTS 59-120381  7/1984  Japan .

Primary Examiner—Howard N. Goldberg
Assistant Examiner—Steven Nichols
Attorney, Agent, or Firm—Fleit, Jacobson, Cohn & Price

[57] ABSTRACT

A working apparatus provided along a workpiece conveyor which includes a carrier for carrying a workpiece. The apparatus includes a carriage supporting a working robot. A gripper is provided on the carriage for gripping the carrier moving on the conveyor. The gripper is movable on the carriage in the direction of movement of the conveyor. The carriage is also movable in the direction of movement of the conveyor. A clamping device is provided between the carriage and the gripper.

5 Claims, 2 Drawing Figures

WORKING APPARATUS PROVIDED ALONG A WORKPIECE CONVEYOR

BACKGROUND OF THE INVENTION

1. Field of the Invention

The present invention relates to working apparatus for performing a predetermined work on a workpiece. More particularly, the present invention pertains to a working apparatus which is adapted for performing a predetermined work
on a workpiece which is being conveyed in a predetermined direction.

2. Description of the Prior Art

Automatic working apparatus are widely used in various
manufacturing plants. For example, in automobile manufacturing plants, welding and assembling robots are used for performing desired works on workpieces such as automobile bodies. Conventionally, the workpieces are carried by a conveyor and cyclically stopped and located in positions at working stations where the robots are positioned.

In order that the works be carried out in an efficient manner, it is preferable that the works be done while the workpieces are being conveyed. Japanese patent application 57-234706 filed on Dec. 27, 1982 and disclosed for public inspection on July 11, 1984 under the disclosure number 59-120381 discloses a working apparatus including a working robot which is mounted on a carriage movable along a workpiece conveyor at a speed substantially the same as the transfer speed of the workpiece on the conveyor. Usually, the workpiece is carried by a workpiece hanger or trolley provided on the conveyor so that the aforementioned Japanese patent application teaches to lock the robot carriage to the hanger or trolley to make the robot move together with the workpiece.

It should however be noted that the arrangement disclosed by the Japanese patent application is not satisfactory because the working robot cannot be accurately located with respect to the workpiece. Generally, workpieces are simply placed on the hangers or trolleys without any locating means so that, even if the robots are accurately located with respect to the hangers or the trolleys, there may be a certain degree of positioning errors between the working robots and the workpieces.

SUMMARY OF THE INVENTION

It is therefore an object of the present invention to provide a working apparatus having working means adapted to be moved together with workpieces which are being transferred on moving conveying means, the apparatus having means for accurately locating the working means with respect to the workpieces.

Another object of the present invention is to provide a working apparatus which can perform a work on a moving workpiece in an effective and precise manner.

A further object of the present invention is to provide a working apparatus having working means which can be accurately located with respect to a workpiece on a moving carrier irrespective of the position of the workpiece with respect to the carrier.

According to the present invention, the above and other objects can be accomplished by a working apparatus provided along workpiece conveying means for conveying in a direction carrying means on which a workpiece is placed, said working apparatus including working means for accomplishing a predetermined work on the workpiece which is being conveyed by the carrying means moving in the conveying means, carriage means movable along said conveying means and carrying said working means, gripping means provided on said carriage means for movement on said carriage means in a direction substantially parallel with the direction in which said carrying means is moved by said conveying means, said gripping means including first clamping means for clamping the gripping means to said carrying means on the conveying means, said carriage means including second clamping means for clamping the gripping means to said carriage means, first detecting means for detecting said carrying means on said conveying means and producing a first detection signal, first clamp actuating means responsive to said first detection signal to actuate said first clamping means, second detecting means for detecting that the workpiece on said carrying means is in a predetermined position with respect to said carriage means and producing a second detection signal, driving means responsive to said second detection signal for driving the carriage means in a direction parallel to the direction of movement of the carrying means in the conveying means, second actuating means responsive to said second detection signal to actuate said second clamping means to thereby clamp the gripping means to the carriage means.

According to the arrangements of the present invention, the first detecting means at first detects that the carrying means is in the working zone and produces the first detection signal. Thus, the first clamping means is actuated to clamp the gripping means to the carrying means. As the result, the gripping means starts to move together with the carrying means. When the workpiece on the carrying means comes to a predetermined position with respect to the carriage means, the second determined means produces the second detection signal so that the driving means starts to operate to thereby move the carriage means in synchronism with the conveying means. At the same time, the second clamping means is actuated to clamp the gripping means to the carriage means so that the carriage means is moved as a unit with the carrying means. Thereafter, the working means is operated to perform the predetermined work on the workpiece.

Since the working means is located in a predetermined position with respect to the carriage means, the working means can be located accurately with respect to the workpiece on the carrying means. It is therefore possible to perform the work at accurate positions on the workpiece.

The above and other objects and features of the present invention will become apparent from the following descriptions of a preferred embodiment taking reference to the accompanying drawings.

DESCRIPTION OF THE PREFERRED EMBODIMENT

Figure 1:
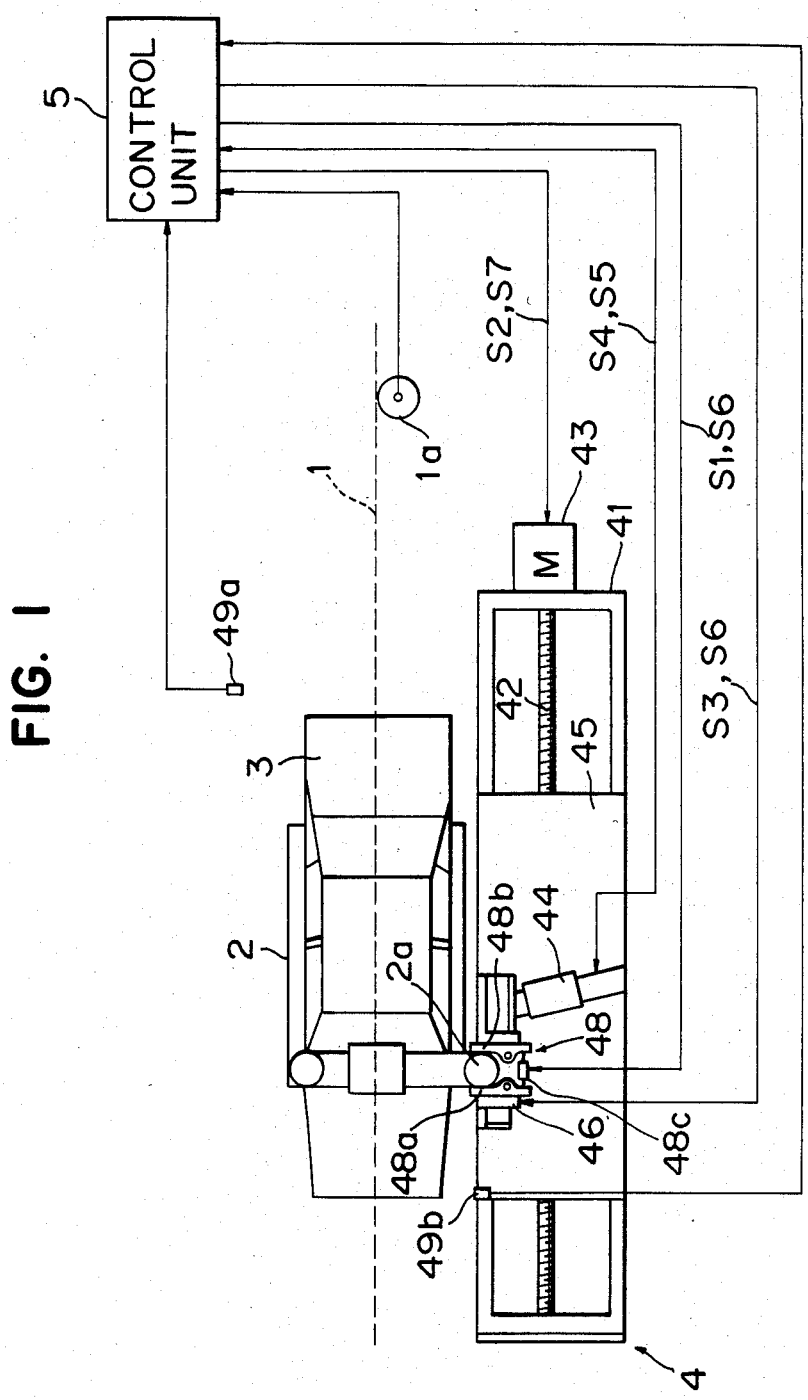
FIG. 1 is a top plan view of the working apparatus in accordance with one embodiment of the present invention; and, FIG. 2 is a side view of the apparatus shown in FIG. 1.

Referring to the drawings, there is shown a conveyor 1 which constitutes an automobile body assembling line. Carriers such as body hangers 2 are carried by the conveyor 1, although only one hanger 2 is shown in the drawigs. An automobile body 3 is carried by the hanger 2 in a manner well known in the art.

Along the conveyor 1, there is a body welding apparatus 4 embodying the features of the present invention and controlled by an electronic control unit 5. The apparatus 4 includes a base 41 which is provided in parallel with the conveyor 1.

Figure 2:
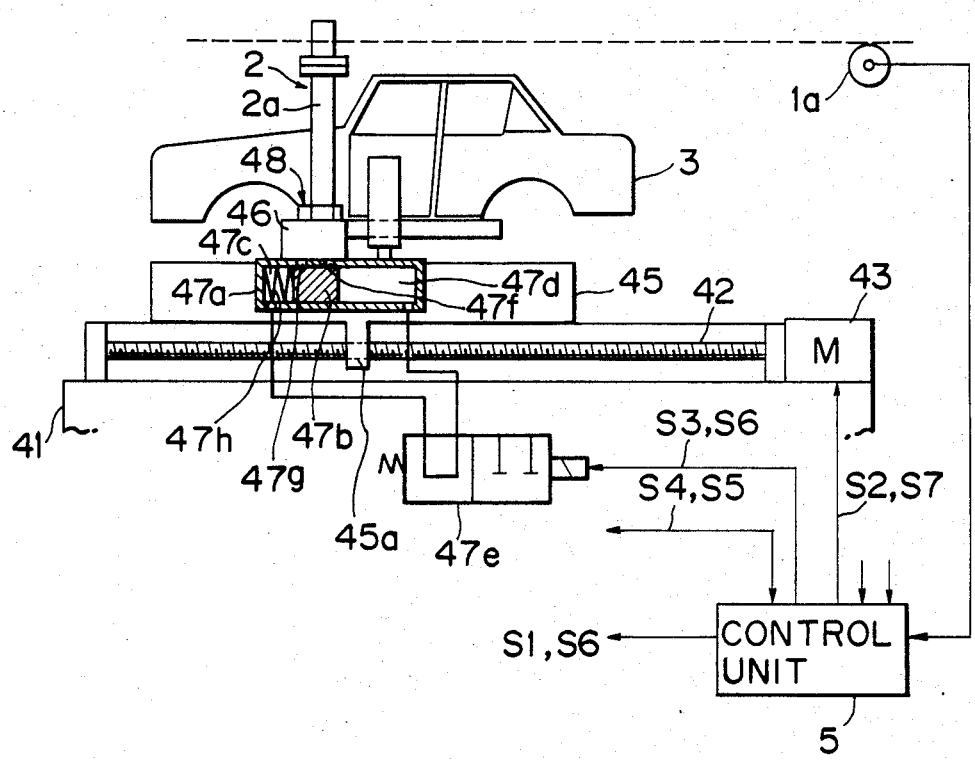

The base 41 has a screw shaft 42 which extends longitudinally along the base 41 and driven by a motor 43. A carriage 45 is provided on the base 41 for movement in a direction parallel with the conveyor 1. The carriage 45 carries a welding robot 44 which may be of a known type. It should of course be noted that the robot 44 may be other type of working robot such as as assembling robot. As shown in FIG. 2, the carriage 45 is formed at the bottom with a nut 45a which is engaged with the screw shaft 42 so that the carriage 45 can be moved by the motor 43 in the direction parallel with the conveyor 1.

The carriage 45 is further provided at a side adjacent to the conveyor 1 with a gripper 46. Beneath the gripper 46, there is provided a hydraulic cylinder 47a which extends in a direction parallel with the conveyor 1. In the cylinder 47a, there is a movable piston 47b which divides inside space of the cylinder 47a into chambers 47c and 47d. A solenoid valve 47e is provided in a hydraulic line between the chambers 47c and 47d. The valve 47e is normally in the position shown in FIG. 2 so that the chambers 47c and 47d are connected together. When the valve 47e is energized, the communication between the chambers 47c and 47d is interrupted. The cylinder 47a is formed with an elongated slot 47f extending longitudinally along the wall of the cylinder 47a but sealingly closed by the piston 47b. The piston 47b is connected with the gripper 46 through a connecting rod 47g passing through the slot 47f. A spring 47h is provided in the cylinder 47a for biasing the piston 47b rightward in the plane of FIG. 2.

The gripper 46 has a hydraulic clamp 48 which includes a pair of clamping arms 48a and 48b and a hydraulic actuator 48c for actuating the clamping arms 48a and 48b. The hanger 2 has vertically extending posts 2a and the clamp 48 is arranged so as to grip one of the posts 2a between the clamping arms 48a and 48b. The gripper 46 is normally in the extreme right position on the carriage 45 under the influence of the spring 47h. The carriage 45 is also in the extreme right position on the base 41.

In the extreme right position of the clamp 48, there is a post detector 49a which is adapted to detect the post 2a on the hanger 2. At the left and of the carriage 45, there is a workpiece detector 49b. The control unit 5 receives detection signals from the detectors 49a and 49b. Further, the control unit 5 receives a conveyor speed signal from a speed detector 1a. When the post 2a of the hanger 2 is detected by the detector 49a and the detection signal is applied to the control unit 5, the control unit 5 produces a clamp signal S1 which is applied to a valve (not shown) for controlling the actuator 48c. Thus, the clamp 48 is actuated to grip the post 2a between the clamping arms 48a and 48b. The gripper 46 then starts to move together with the hanger 2. At this time, the valve 47e is in the position wherein it connect the chambers 47c and 47d together so that the piston 47b is free to move in the cylinder 47a.

As the hanger 2 further moves, the leading and of the workpiece 3 approaches the position where the detector 49b is provided. Then, the detector 49b produces the detection signal which is applied to the control unit 5. The control unit 5 then produces motor drive signal S2 and a lock signal S3 so that the motor 43 is operated to drive the screw shaft 42 to thereby move the carriage 45 and at the same time the solenoid valve 47e is energized to block the communication between the chambers 47c and 47d in the cylinder 47a. The motor drive signal S2 is such that the motor M is operated synchronously with the speed of the conveyor 1 so that the carriage 45 is moved synchronously with the hanger 2. Since the communication between the chambers 47c and 47d is blocked, the piston 47b is constrained in the cylinder 47a so that the gripper 46 is locked in position with respect to the carriage 45. Thus, the carriage 45 is moved as a unit with the hanger 2. Thereafter, a signal S4 is applied from the control unit 5 to the robot 44 to make the robot 44 perform a predetermined welding work.

When the work is completed, the robot 44 produces a signal S5 which is applied to the control unit 5. The control unit 5 then produces a lock release signal S6 and a return signal S7. The signal S6 functions to operate the actuator 48c to thereby release the clamp 48 whereas the signal S7 functions to operate the motor 43 in the reverse direction.

The invention has thus been shown and described with reference to a specific embodiment, however, it should be noted that the invention is in no way limited to the details of the illustrated structures but changes and modifications may be made without departing from the scope of the appended claims.

I claim:

1. A working apparatus provided along workpiece conveying means for conveying in a direction carrying means on
   which a workpiece is placed, said working apparatus including working means for accomplishing a predetermined work on the workpiece which is being conveyed by the carrying means moving in the conveying means, carriage means movable along said conveying means and carrying said working means, gripping
   means provided on said carriage means for movement on said carriage means in a direction substantially parallel with the direction in which said carrying means is moved by said conveying means, said gripping means including first clamping means for clamping the gripping means to said carrying means
   on the conveying means, said carriage means including second clamping means for clamping the gripping means to said carriage means, first detecting means for detecting said carrying means on said conveying means and producing a first detection signal, first clamp actuating means responsive to
   said first detection signal to actuate said first clamping means, second detecting means for detecting that the workpiece on said carrying means is in a predetermined position with respect to said carriage means and producing a second detection signal, driving means responsive to said second detection signal for driving the carriage means in a direction parallel to the direction of movement of the carrying means in the conveying means, second actuating means responsive to said second detection signal to actuate said second clamping means to thereby clamp the gripping means to the carriage means.

2. A working apparatus in accordance with claim 1 in which said gripping means includes a pair of gripping arms which is actuated by said first clamp actuating means between a clamping position and a release position.

3. A working apparatus in accordance with claim 1 in which said second clamping means includes a hydraulic cylinder provided on one of the carriage means and said gripping means, a piston slidable in said cylinder and connected with the other of the carriage means and said gripping means, said piston dividing inside space of the cylinder into two chambers, and valve means for controlling communication between the two chambers.

4. A working apparatus in accordance with claim 1 which further includes third detecting means for detecting conveying speed of said carrying means, and means for controlling said driving means so that the carriage means is moved synchronously with the movement of the carrying means.

5. A working apparatus in accordance with claim 1 in which electronic control means is provided for controlling the first and second clamp actuating means and said driving means in accordance with said first and second detection means.

* * * * *